3,157,704
PREPARATION OF GLYCOLS FROM DISUBSTI-
TUTED ACETYLENES
Klaus Arthur Saegebarth, Wilmington, Del., assignor to
E. I. du Pont de Nemours and Company, Wilmington,
Del., a corporation of Delaware
No Drawing. Filed Nov. 2, 1959, Ser. No. 850,042
4 Claims. (Cl. 260—618)

This invention is directed to a novel process for the preparation of organic diols and, in particular, a novel process for making vicinal glycols from disubstituted acetylenes.

It is known that glycols can be made from olefins by hydrolytic cleavage of the corresponding olefin oxides; this procedure, however, has not been demonstrated for acetylenes. Furthermore, the attempted hydroxylation of substituted acetylenes with a mercury salt catalyst yields ketones. Although it is known that diphenylacetylene can be oxidized to an alpha diketone which, in turn, can be reduced to give the corresponding vicinal glycol, this route has not been broadly applied.

It is an object of the present invention to provide a novel process for making organic diols. It is a further object of this invention to provide a novel process for making vicinal glycols. Another object of this invention is to provide a novel process for preparing glycols from disubstituted acetylenes. These and other objects will become apparent in the following description and claims.

More specifically, the present invention is directed to a process for preparing a glycol which process comprises: (1) forming an organoborine compound by reacting (a) about 2 to 3 moles of a disubstituted acetylene having the formula R—C≡C—R', where R and R' (which need not be the same) are alkyl radicals or benzyl radicals or hydrocarboaryl radicals or substituted benzyl radicals or substituted hydrocarboaryl radicals, said substituents being selected from the group consisting of lower alkyl, lower alkoxy, fluoro, chloro, or bromo, with (b) one mole of diborane in the presence of at least 2 moles of a dialkyl ether (or a cyclic alkylene ether selected from the group consisting of 1,3-dioxane, tetrahydrofuran and tetrahydropyran) in an inert solvent at a temperature greater than about −80° C.; (2) isolating the resulting organoborine compound; (3) reacting said organoborine compound in an inert solvent with at least 3 moles of oxygen for every mole of diborane consumed in the preparation of said organoborine compound; (4) hydrolyzing the resulting oxidized organoborine compound, and (5) recovering the glycol thereby liberated.

The diborane which is used in preparing the novel organoborines of the present invention may be prepared by adding a solution of sodium borohydride to a solution of boron trifluoride etherate. This method of preparation is more particularly described in "Journal of Organic Chemistry," vol. 22, page 1137 (1957). The sodium borohydride and boron trifluoride etherate solution is preferably made using the dimethyl ether of diethylene glycol as a solvent. If desired, tetrahydrofuran or diethyl ether or di-n-butyl ether may be used as the solvent. The use of sodium borohydride is preferred since it is one of the most readily available borohydride reagents, however, other compounds such as potassium borohydride, lithium borohydride, calcium borohydride, or magnesium borohydride can be used. Also, the use of boron trifluoride etherate is preferred because here again it is a readily available liquid. However, in general, the etherates of any saturated acyclic lower molecular weight aliphatic ether with boron trifluoride may be used. In preparing the diborane, the solution of sodium borohydride is added to the solution of boron trifluoride etherate just fast enough to maintain gentle gas evolution. The formation of diborane is quite exothermic. It is to be understood that other methods of preparation can be used for the diborane such as reacting boron trifluoride with lithium aluminum hydride.

The disubstituted acetylenes which are used for reaction with diborane in the present process may be represented by the formula R—C≡C—R', where R and R' are alkyl, benzyl, hydrocarboaryl radicals, benzyl radicals having lower alkyl, lower alkoxy, fluorine, chorine, or bromine substituents, and hydrocarboaryl radicals having lower alkyl, lower alkoxy, fluorine, chlorine, or bromine substituents; the R and R' radicals may differ in the same molecule. Representative examples of these compounds are: 2-butyne, 2-pentyne, 2-hexyne, 3-hexyne, 4-methyl-2-pentyne, 2-heptyne, 3-heptyne, 2-methyl-3-hexyne, 5-methyl-2-hexyne, 4-methyl-2-hexyne, 4,4-dimethyl-2-pentyne, 2-octyne, 3-octyne, 4-octyne, 2,5-dimethyl-3-hexyne, 2-nonyne, 3-nonyne, 4-nonyne, 2-methyl-3-octyne, 7-methyl-3-octyne, 2,6-dimethyl-3-heptyne, 5,5-dimethyl-3-heptyne, 3-decyne, 4-decyne, 5-decyne, 8-methyl-4-nonyne, 7-methyl-5-nonyne, 2,2-dimethyl-3-octyne, 5-ethyl-5-methyl-3-heptyne, 2,2,5,5-tetramethyl-3-hexyne, 4-undecyne, 5-undecyne, 3-methyl-4-decyne, 3,3-dimethyl-4-nonyne, 3-dodecyne, 5-dodecyne, 6-dodecyne, 2,9-dimethyl-5-decyne, 3,3-dimethyl-4-decyne, 4-tridecyne, 7-tetradecyne, 2-hexadecyne, 7-heptadecyne, 9-octadecyne, diphenylacetylene, bis(o-methoxyphenyl)acetylene, bis (6-methoxy-1-naphthyl)acetylene, bis(p-bromophenyl) acetylene, 1,3-diphenylpropyne, 1-phenyl-1-hexyne, and 1,4-diphenyl-2-butyne.

In preparing the organoborines the diborane is introduced into a reaction vessel where it contacts the acetylene which is generally dissolved in an inert solvent. An inert atmosphere must be preserved during the preparation of the organoborines because diborane may burst into flame or explode when contacted with air. Highly purified argon is satisfactory as an inert atmosphere, but other equally inert gases such as highly purified nitrogen may be used. Before the diborane is introduced into the reaction vessel all traces of air are thoroughly swept from the reaction system and a positive pressure is maintained by inflow of the inert gas until all the acetylene and diborane have reacted and any residual diborane has been removed from the system.

The reaction between the diborane and the acetylene must be carried out in the presence of an aliphatic ether. Essentially any saturated aliphatic ether may be used which satisfies all of the following requirements: (1) it can coordinate with diborane; (2) it has no substituents which will react with diborane under the reaction conditions employed for making the organoborine compound; (3) it is also stable toward cleavage under these reaction conditions. In order to facilitate the isolation of the organoborine compound, it is preferred that the ether compound be relatively volatile (have a boiling point below about 150° C. at atmospheric pressure). The preferred ethers are dialkyl ethers such as the following: diethyl ether (B.P. 34.6° C./760 mm. Hg); diisopropyl ether (B.P. 68.3° C./760 mm. Hg); and di-n-butyl ether (B.P. 142.4° C./760 mm. Hg). Certain cyclic alkylene ethers may be used such as tetrahydrofuran (B.P. 65.6° C./760 mm. Hg), tetrahydropyran (B.P. 88° C./760 mm. Hg) and 1,3-dioxane (B.P. 105–106° C./760 mm. Hg). At least 2 moles of the aliphatic ether is employed for each mole of diborane used because the conversion of the acetylene to the organoborine is much reduced when a lower proportion is present.

In addition to the aliphatic ether, an insert solvent such as a saturated aliphatic hydrocarbon may be used as a diluent for the reaction of the diborane with the acetylene. Any solvent may be used which is inert to the reactants and which boils low enough to be easily removed after the organoborine has formed. Representative solvents include pentane, which is preferred, cyclohexane, isooctane and n-decane. If desired, the saturated aliphatic ethers described above for the reaction of the diborane with the acetylene may be employed. In this instance the ether serves both as a promoter and a solvent. Other ethers which may be used include the dimethyl ether or diethyl ether of diethylene glycol. The solvent, in order that it not interfere with formation of the organoborine, should be free of any groups which may be reduced by diborane under the conditions of the reaction.

In preparing the organoborines, about 2–3 moles of the acetylene should be used for every mole of the diborane. Higher proportions of acetylene tend to produce an undesired organoborine having a C—C double bond. Lower proportions consume a wasteful amount of diborane.

In general, the reaction of the diborane and the acetylene is carried out at atmospheric pressure; the maximum temperature then utilized is not far above the boiling point of the acetylene. It is to be understood, however, that the process may be operated at superatmospheric pressure. The temperatures at which satisfactory results can be achieved range from about −80° C. to about 100° C. It is not convenient to operate at temperatures below −80° C.; excessive cooling facilities are required; there is a tendency for the reaction mixture to thicken and solidify. Temperature should be kept below 100° C. to avoid risking the thermal decomposition of diborane itself.

Facilities for applying external cooling should be provided. As noted above, the formation of organoborine is quite exothermic.

After the diborane-acetylene reaction is completed, the resulting organoborine is obtained by concentrating the solution under vacuum. The resulting organoborine should be kept under an inert atmosphere such as argon or nitrogen. During the concentration, the temperature used must be below that at which isomerization of the organoborine occurs, if it is desired to use that organoborine to make a vicinal glycol. It has been determined, for example, that the organoborine compounds made from 2-butyne or 3-hexyne isomerize readily at 160° C.; the diols ultimately obtained from them were, respectively, 1,4-butane diol and 1,5-hexanediol. It is considered to be readily within the skill of the art to study the isomerization behavior of a particular organoborine and to select the operating conditions accordingly. Where isomerization is facile, it is obvious that the solvents used should exhibit as high a vapor pressure as possible at room temperature.

The organoborines made according to the present novel process are low-melting solids which dissolve easily in common solvents such as ethanol, pentane, and diethyl ether. In general, these organoborines react with oxygen and may spontaneously ignite when contacted with air. On burning, all of them display the characteristic green flame of boron compounds.

After the organoborine compound is recovered, it is converted to a diol by oxidation and hydrolysis. Each molecule of the organoborine is oxidized with 3 moles of molecular oxygen (or its equivalent provided by an oxygen-bearing oxidizing agent) to obtain an intermediate which is hydrolyzed to the diol. Normally this diol is a vicinal glycol; however, as has been mentioned above, non-vicinal glycols may be obtained when the organoborine compound has been thermally isomerized prior to oxidation.

This oxidation and hydrolysis can be carried out in one stage by contacting the organoborine compound with aqueous hydrogen peroxide in the presence of base. For example, a 30% aqueous hydrogen peroxide solution is added to a solution of the organoborine compound in ethanol containing about 5–10% by weight of sodium hydroxide. About 2 moles of base is present for every mole of the organoborine compound. Since the oxidation is very exothermic, the peroxide solution is added at a rate just sufficient to maintain reflux. A slight excess of peroxide may be required before the reaction mixture displays a positive starch iodide test. When enough peroxide has been added, the mixture is cooled and decanted from the precipitated sodium borate. The mixture is neutralized with acetic acid, dried, and distilled to yield the product diol.

Alternatively, air or oxygen can be introduced into an anhydrous solution of the organoborine in a solvent that is not readily oxidized; then water is introduced to hydrolyze the intermediate obtained. The air oxidation can be carried out at ambient temperature; it is very exothermic and can be controlled by regulating the rate of air or oxygen inflow. If desired, organic or inorganic peroxy acids can be used in place of air or oxygen. During the hydrolysis at least 6 moles of water is supplied for each mole of organoborine used.

The process of the present invention provides a convenient way in which a disubstituted acetylenic compound can be converted to a glycol. Thus this process provides a way in which relatively pure bifunctional hydroxy compounds may be prepared and it will be readily appreciated that these diols have a wide variety of uses. They are solvents for essential oils, resins, dyestuffs and gums. They can be employed as components for brake fluids and as heat transfer liquids. They are blending agents and coupling agents for cutting oils and dry-cleaning soaps. Esters of these diols and suitable mono-basic acids are plasticizers for thermoplastic resins such as cellulose nitrate, polyvinyl chloride, polyvinyl esters, polyacrylates, and polymethacrylates. They can be reacted with dicarboxylic acids to give polyester resins suitable for use as protective coatings. Polyurethanes, e.g. the reaction product of 1,4-butanediol and 1,6-hexanediisocyanate, can be made which are of value for synthetic fibers.

Representative examples illustrating the present invention follow.

EXAMPLE 1

*Preparation of an Organoborine Compound From Diethylacetylene*

[A] Two reaction vessels were used. Diborane was generated in the first and contacted with the acetylene in the second. Argon gas was swept through both vessels to displace air as completely as possible before the reaction was begun. A continual argon sweep was maintained during the reaction to maintain a positive pressure in the system. The exit vent of the second reactor was connected to a bubbler tower containing acetone; any diborane displaced from the second reactor was destroyed as it emerged from the bubbler tube below the surface of the acetone. After the reaction had been completed, argon was swept through the reaction vessels for several hours to remove residual diborane.

Into the first vessel were poured 20 milliliters of the dimethyl ether of diethylene glycol and 33 milliliters of boron trifluoride: diethylether complex. Into the second vessel were introduced with agitation 100 milliliters of anhydrous ether, 150 milliliters of anhydrous pentane and 24.6 grams (0.3 mole) of 3-hexyne. External cooling was applied and the temperature of the well-stirred solution was lowered to about 2° C.

Diborane was generated by adding 200 milliliters of a 1.0 M sodium borohydride solution in the dimethyl ether of diethylene glycol to the first vessel with agitation according to the schedule shown in Table I which follows. The diborane was swept into the second vessel where it was admitted by a bubbler outlet positioned below the surface of the solution contained therein.

TABLE I

| Time (Min.) | Reaction Flask, T. (° C.) | Total Vol. NaBH₄ Soln. Added |
|---|---|---|
| 0 | 20 | 0 |
| 15 | 22 | 25 |
| 30 | 29.5 | 50 |
| 50 | 30 | 100 |
| 54 | 26.5 | 105 |
| 75 | 22 | 145 |
| 86 | 25 | 175 |
| 105 | 25 | 200 |
| 155 | 28 | [1] 200 |
| 215 | 28 | [1] 200 |
| 265 | 27 | [1] 200 |
| 305 | 27 | [1] 200 |

[1] External heat was applied with a hot water bath to the flask to which the NaBH₄ solution had been added.

The clear colorless reaction mixture was allowed to stand under a protective nitrogen blanket for about 16 hours. A representative sample then taken did not fume in air but, when ignited, burned with a green, smokeless flame. Removal of the solvent from the mixture yielded 27.0 grams of a clear, colorless, very viscous liquid organoborine.

[B] A liquid of organoborine of Part [A] was used to prepare 3,4-hexanediol. A reaction vessel was employed equipped with an agitator and a condenser. 8.0 grams (0.2 mole) of sodium hydroxide was dissolved with stirring in 125 milliliters of ethyl alcohol. The organoborine prepared in Part [A] was then dissolved with agitation in this basic solution. Heat was evolved. During a period of 1 hour and 15 minutes 81.6 grams of 30% hydrogen peroxide was added cautiously with stirring; the heat evolved brought the mixture to reflux. When the addition was finished, a sample of the mixture exhibited a positive starch iodide test. The mixture was allowed to cool. The clear, colorless supernatant liquid was decanted from an inorganic white precipitate which was then washed thrice with 100-ml. portions of diethyl ether. The combined organic phases were subsequently dried over anhydrous magnesium sulfate. The solvent was allowed to evaporate and the residue was fractionally distilled to give 17 grams of 3,4-hexanediol boiling at 89–92° C. (15 min.).

EXAMPLE 2

*Preparation of an Organoborine Compound From Dimethyl Acetylene*

[A] The general procedure described in Part [A] of Example 1 was used except that the acetylene compound was introduced while the diborane was being generated.

To a solution consisting of 90 milliliters of a boron trifluoride: diethylether complex and 20 milliliters of the dimethyl ether of ethylene glycol was added 500 milliliters of a 1.0 molar solution of sodium borohydride in the dimethyl ether of diethylene glycol. The diborane (about 0.36 mole) thereby generated was bubbled into a solution of 32.4 grams (0.6 mole) of dimethylacetylene (also known as 2-butyne) in 100 milliliters of diethyl ether and 150 milliliters of pentane. The schedule observed is shown in Table II which follows:

TABLE II

| Time (Min.) | Rx Flask Temp., (° C.) | Total Vol. DMA[1] Added (ml.) | Total Vol. NaBH₄ Soln. Added (ml.) |
|---|---|---|---|
| 0 | −1 | 0 | 0 |
| 1 | −1 | 7 | 0 |
| 11 | −7 | 30 | 30 |
| 20 | −1.5 | 45 | 50 |
| 35 | 5 | 47 | 140 |
| 48 | 6 | 47 | 180 |
| 65 | 4 | 47 | 235 |
| 105 | 4 | 47 | 350 |
| 120 | 7 | 47 | 375 |
| 155 | 6 | 47 | 465 |
| 170 | | 47 | [1] 500 |
| 220 | 7 | 47 | [1] 500 |
| 283 | 10 | 47 | [1] 500 |
| 301 | 16 | 47 | [1] 500 |
| 320 | 22 | 47 | [1] 500 |

[1] External heat was applied with a hot water bath to the flask to which the NaBH₄ solution has been added.

Heat was evolved for a few minutes after all the dimethylacetylene had been added. Concentration of the clear, colorless solution obtained gave 37.2 grams of organoborine compound in the form of a colorless syrup.

[B] 36.4 grams of an organoborine compound prepared by a procedure essentially the same as that of Example 2 Part [A] was oxidized with hydrogen peroxide by a procedure similar to that described in Part [B] of Example 1. Hydrolysis of the oxidized product gave an oil which was fractionally distilled to give 27.4 grams of 2,3-butanediol B.P. 108° C. (68 mm. Hg) and 112–114° C. (72 mm. Hg); the diphenylurethane derivative melted at 201–201.5° C. (reported 201–202° C.).

EXAMPLE 3

*Preparation of an Organoborine Compound From Diphenylacetylene*

[A] The general procedure described in Part [A] of Example 1 was used. Diborane was generated during a period of one hour by adding 100 milliliters of 1.0 molar sodium borohydride solution to 16 milliliters of boron trifluoride: diethylether complex in 10 milliliters of the dimethyl ether of diethylene glycol. The organoborine compound was made by introducing the diborane into a solution of 17.8 grams (0.1 mole) of diphenylacetylene in 100 milliliters of anhydrous diethyl ether and 150 milliliters of pentane at a temperature ranging between 20 and 25° C. The reaction mixture was stored under a nitrogen atmosphere for 2 days at room temperature. Removal of the solvents gave 17.0 grams of organoborine compound in the form of a yellow crystalline solid which did not fume or ignite when exposed to an air atmosphere; it was soluble in common solvents such as diethyl ether, pentane, benzene, ethanol, and acetone.

[B] A reaction vessel was employed equipped with an agitator and a condenser. 2.7 grams (0.006 mole) of sodium hydroxide was dissolved with stirring in 125 milliliters of ethyl alcohol. The organoborine compound prepared in Part [A] above was then dissolved with agitation in this basic solution. During the next 30 minutes 35 milliliters of 30% aqueous hydrogen peroxide was cautiously added. Afterward the reaction mixture was heated for 1.5 hours. It was then found to exhibit a positive starch iodide test. The mixture was cooled and the solvent evaporated. The residue obtained was diluted with 500 milliliters of water; the resulting solution was extracted with 3 200-ml. portions of ether which were subsequently dried over anhydrous magnesium sulfate. Concentration of the ether solution gave a white crystalline residue which was recrystallized from a mixture of benzene and hexane to yield 14.2 grams of meso-hydrobenzoin melting at 132–133° C.

EXAMPLE 4

Isomerization of the Organoborine Product

[A] The organoborine product prepared by the procedure of Part [A] of Example 1 was heated at 160° C. for 8 hours under a nitrogen atmosphere. Its appearance changed from a viscous colorless clear syrup to a mobile brown clear liquid.

Oxidation of the Isomerized Organoborine Product

[B] The isomerized organoborine compound was dissolved in 125 milliliters of ethanol containing 8.0 grams (0.2 mole) of sodium hydroxide. The brown color was discharged immediately. 75 milliliters of 30% aqueous hydrogen peroxide was then added cautiously over a 1.5-hr. period. Much heat was evolved and a pasty white mass precipitated. When the addition was finished, the mixture displayed a positive starch iodide test. The reaction mixture was heated on the steam bath for 2 hours. It was then cooled, the aqueous layer was separated, extracted with 2 200-ml. portions of ether, and the combined organic phases were dried over anhydrous magnesium sulfate. Fractional distillation finally gave 15.6 grams of 1,5-hexanediol, boiling at 131° C. (9 mm. Hg).

EXAMPLE 5

Isomerization of the Organoborine Product

[A] The organoborine product prepared by the procedure of Part [A] of Example 2 was heated at 160° C. for 8 hours under a nitrogen atmosphere. Its viscosity decreased during this time.

Oxidation of the Isomerized Organoborine Product

[B] 0.2 mole of the organoborine compound prepared in Part [A], Example 5 was oxidized according to the procedure described in Part [B] of Example 1. Fractional distillation of the product gave 25.1 grams of 1,4-butanediol boiling at 118° C. (5 mm. Hg).

The novel process of the present invention may be practiced, by substituting in the preceding examples, any of the disclosed species disubstituted acetylenes, dialkyl ethers, cyclic alkylene ethers, and, inert solvents to achieve substantially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing glycols, which process comprises (1) contacting, in an inert atmosphere, (a) from about 2 to 3 moles of a disubstituted acetylene having the formula R—C≡C—R', (wherein R and R' are independently selected from the group consisting of alkyl, benzyl, phenyl, naphthyl and benzyl, phenyl and naphthyl radicals substituted with a member taken from the group consisting of lower alkyl, lower alkoxy, fluorine, chlorine and bromine, with (b) one mole of diborane, in the presence of at least two moles of an ether selected from the group consisting of a dialkyl ether, 1,3-dioxane, tetrahydrofuran, and tetrahydropyran, in an inert solvent, at a temperature within the range of about —80° C. to 100° C., said ether compound being one (i) which can coordinate with said diborane, (ii) which has no substituents reactive with diborane under said reaction conditions and (iii) which is stable toward cleavage under said reaction conditions, (2) followed by isolating the organoborine compound resulting from step (1), (3) oxidizing said organoborine compound in an inert solvent with about 3 moles of oxygen for each mole of organoborine compound isolated in the step (2), (4) followed by hydrolyzing the oxidized organoborine compound resulting from step (3) with at least 6 moles of water per mole thereof and (5) recovering the glycol resulting from step (4).

2. The process of claim 1 wherein the disubstituted acetylene compound utilized in diethyl acetylene.

3. The process of claim 1 wherein the disubstituted acetylene compound utilized is dimethyl acetylene.

4. The process of claim 1 wherein the disubstituted acetylene compound utilized is diphenyl acetylene.

References Cited in the file of this patent

UNITED STATES PATENTS 2,437,648    Milas _____ Mar. 9, 1948

OTHER REFERENCES

Brown et al.: Jour. Amer. Chem. Soc., vol. 81, Mar. 20, 1959, page 1512 (1 page).

Johnson et al.: Jour Amer. Chem. Soc., vol. 60, 1938, page 121 (1 page).

Mikhailou et al.: Chemical Abstracts, vol. 51, 1957, page 1026 (1 page).